(12) United States Patent
Murazumi et al.

(10) Patent No.: US 12,281,700 B2
(45) Date of Patent: Apr. 22, 2025

(54) VEHICLE CONTROL DEVICE

(71) Applicants: JATCO Ltd, Fuji (JP); NISSAN MOTOR CO., LTD., Yokohama (JP)

(72) Inventors: Tarou Murazumi, Atsugi (JP); Hajime Tasaka, Ebina (JP); Junki Matsui, Fuji (JP); Masakatsu Ogawa, Isehara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/548,758

(22) PCT Filed: Feb. 25, 2022

(86) PCT No.: PCT/JP2022/007945
§ 371 (c)(1),
(2) Date: Sep. 1, 2023

(87) PCT Pub. No.: WO2022/186077
PCT Pub. Date: Sep. 9, 2022

(65) Prior Publication Data
US 2024/0151305 A1    May 9, 2024

(30) Foreign Application Priority Data
Mar. 5, 2021   (JP) .................. 2021-035858

(51) Int. Cl.
*F16H 61/12* (2010.01)
*F16H 61/00* (2006.01)
*F16H 63/50* (2006.01)

(52) U.S. Cl.
CPC ......... *F16H 61/0025* (2013.01); *F16H 61/12* (2013.01); *F16H 63/50* (2013.01); *F16H 2061/122* (2013.01); *F16H 2061/1292* (2013.01)

(58) Field of Classification Search
CPC ............... F16H 61/0025; F16H 61/12; F16H 2061/122; F16H 2061/1292; F16H 63/50
See application file for complete search history.

(56) References Cited

U.S. PATENT DOCUMENTS

2013/0319366 A1* 12/2013 Karasawa ............... F01M 1/02
                                                                123/196 R
2018/0037229 A1*  2/2018 Nakano ................. B60W 10/06

FOREIGN PATENT DOCUMENTS

| JP | 2005-308046 A | 11/2005 |
|---|---|---|
| JP | 2009-133332 A | 6/2009 |

(Continued)

*Primary Examiner* — Lori Wu
(74) *Attorney, Agent, or Firm* — Foley & Lardner LLP

(57) ABSTRACT

A vehicle includes a transmission which has a first oil pump driven by rotation of a drive source that drives a drive wheel and a second oil pump provided with a check valve on a suction side and driven by a motor. In a vehicle control device for controlling the vehicle, a minimum value of a drive current value of the motor is defined as a first current value, when the second oil pump is driven in a normal drive state, and a minimum rotation speed of the drive source is increased compared to a case in which the drive current value of the motor is equal to or larger than the first current value, when an automatic downshift control for automatically downshifting a speed ratio of the transmission is executed in a case in which the drive current value of the motor is smaller than the first current value when the second oil pump is driven.

7 Claims, 5 Drawing Sheets

(56) References Cited

FOREIGN PATENT DOCUMENTS

| | | |
|---|---|---|
| JP | 2012-057688 A | 3/2012 |
| JP | 2017-122389 A | 7/2017 |
| JP | 2017-210918 A | 11/2017 |
| JP | 2020-165516 A | 10/2020 |

* cited by examiner

VEHICLE CONTROL DEVICE

TECHNICAL FIELD

The present invention relates to a vehicle control device, a vehicle control method, and a computer-executable program for controlling a vehicle.

BACKGROUND ART

Patent Document 1 discloses a hydraulic oil supply device including: a mechanical oil pump having a first suction port; an electric oil pump having a second suction port and having a capacity lower than a capacity of the mechanical oil pump; a strainer having a hydraulic oil suction port, a first discharge port connected to the first suction port, and a second discharge port connected to the second suction port; and a check valve that is provided between the hydraulic oil suction port and the second suction port, is opened when the electric oil pump is driven while the mechanical oil pump is not driven, and is closed when the electric oil pump is not driven while the mechanical oil pump is driven.

PRIOR ART DOCUMENT

Patent Document

Patent Document 1: 2020-165516 A

SUMMARY OF INVENTION

In the hydraulic oil supply device described in Patent Document 1, when the check valve is not opened, an amount of oil supplied from the electric oil pump decreases, and the oil is insufficient in a transmission mechanism, which may cause a delay in shifting.

The present invention has been made in view of such a problem, and an object thereof is to provide a vehicle control device and a vehicle control method that can appropriately control a transmission when a check valve provided on a suction side is not opened.

A vehicle according to one aspect of the present invention includes a transmission which has a first oil pump driven by rotation of a drive source that drives a drive wheel and a second oil pump provided with a check valve on a suction side and driven by a motor. In a vehicle control device for controlling the vehicle, a minimum value of a drive current value of the motor is defined as a first current value, when the second oil pump is driven in a normal drive state, and a minimum rotation speed of the drive source is increased compared to a case in which the drive current value of the motor is equal to or larger than the first current value, when an automatic downshift control for automatically downshifting a speed ratio of the transmission is executed in a case in which the drive current value of the motor is smaller than the first current value when the second oil pump is driven.

A vehicle according to another aspect of the present invention includes a transmission which has a first oil pump driven by rotation of a drive source that drives a drive wheel and a second oil pump provided with a check valve on a suction side and driven by a motor. In a vehicle control device for controlling the vehicle, a minimum value of a drive current value of the motor is defined as a first current value, when the second oil pump is driven in a normal drive state, and an idle reduction control for automatically stopping the drive source while the vehicle is stopped is not executed in a case in which the drive current value of the motor is smaller than the first current value when the second oil pump is driven.

A vehicle according to another aspect of the present invention includes a transmission which has a first oil pump driven by rotation of a drive source that drives a drive wheel and a second oil pump provided with a check valve on a suction side and driven by a motor. In a vehicle control device for controlling the vehicle, a coast stop control for stopping the engine ENG (drive source) automatically and interrupting power transmission between the drive source and the drive wheel while the vehicle is traveling is not executed in a case in which the drive current value of the motor is smaller than the first current value when the second oil pump is driven.

According to this aspect, the transmission can be appropriately controlled when the check valve provided on the suction side is not opened.

DESCRIPTION OF EMBODIMENTS

Embodiments of the present invention will be described below with reference to the accompanying drawings.

Figure 1:
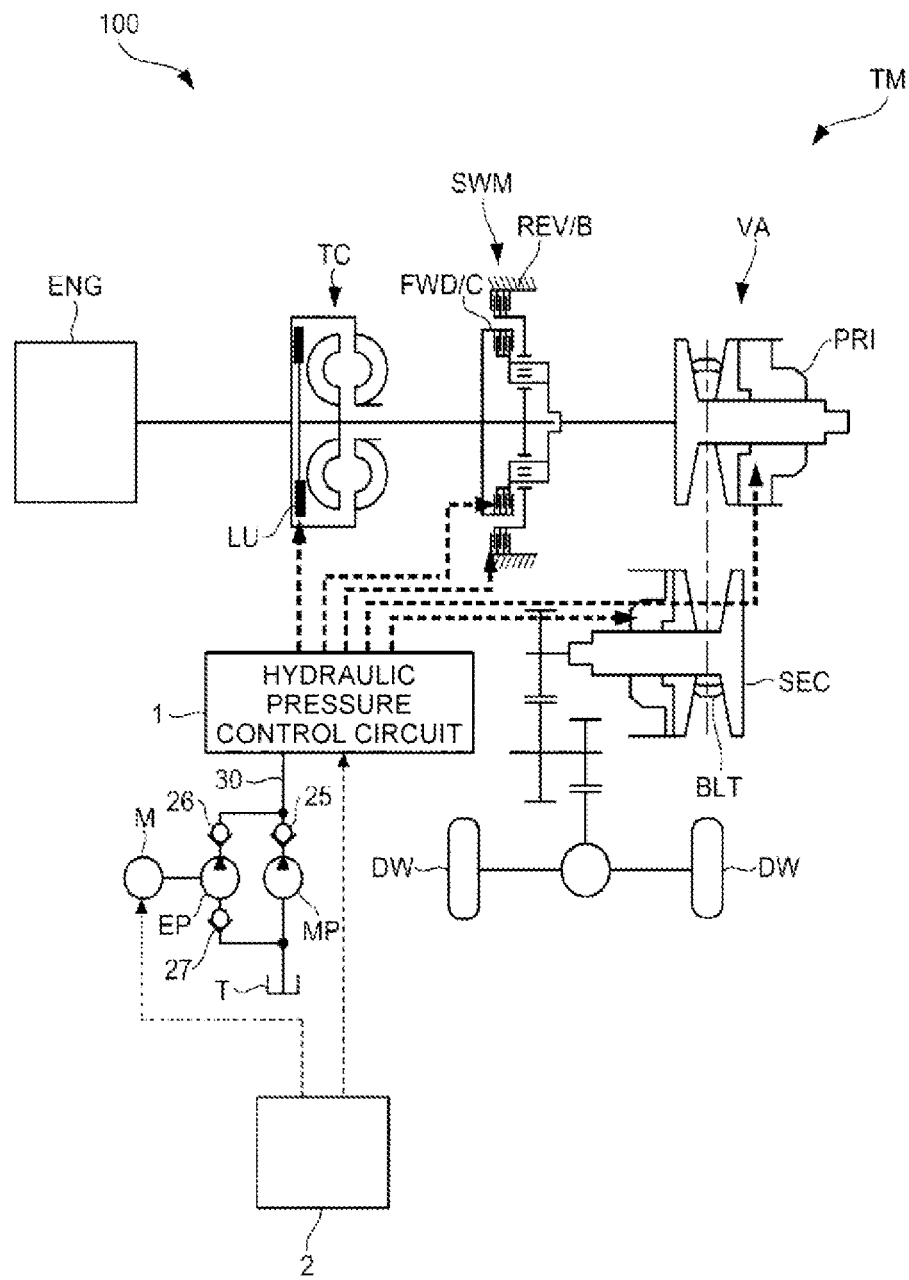
FIG. 1 is a schematic configuration diagram of a vehicle on which a hydraulic pressure control circuit of a transmission according to the present embodiment is mounted.

FIG. 1 is a schematic configuration diagram of a vehicle 100. The vehicle 100 includes an engine ENG, a torque converter TC, a forward and reverse traveling switching mechanism SWM, and a variator VA. In the vehicle 100, a transmission TM is a belt continuously variable transmission including the torque converter TC, the forward and reverse traveling switching mechanism SWM, and the variator VA.

The engine ENG constitutes a drive source of the vehicle 100. The engine ENG is, for example, a gasoline engine. Power from the engine ENG is transmitted to drive wheels DW via the torque converter TC, the forward and reverse traveling switching mechanism SWM, and the variator VA. In other words, the torque converter TC, the forward and reverse traveling switching mechanism SWM, and the variator VA are provided in a power transmission path connecting the engine ENG and the drive wheels DW.

The torque converter TC transmits power via a fluid. In the torque converter TC, a power transmission efficiency is improved by engaging a lock-up clutch LU.

The forward and reverse traveling switching mechanism SWM is provided in a power transmission path connecting the engine ENG and the variator VA. The forward and reverse traveling switching mechanism SWM switches forward and reverse traveling of the vehicle 100 by switching a rotation direction of rotation to be input. The forward and reverse traveling switching mechanism SWM includes a forward clutch FWD/C engaged when a forward (D) range is selected and a reverse brake REV/B engaged when a reverse (R) range is selected. When the forward clutch FWD/C and the reverse brake REV/B are disengaged, the transmission TM enters a neutral state, that is, a power transmission interrupted state.

The variator VA constitutes a belt continuously variable transmission mechanism including a primary pulley PRI, a secondary pulley SEC, and a belt BLT wound around the primary pulley PRI and the secondary pulley SEC. A primary pulley pressure Ppri, which is a hydraulic pressure for driving the primary pulley PRI, is supplied to the primary pulley PRI from a hydraulic pressure control circuit 1 to be described later, and a secondary pulley pressure Psec, which is a hydraulic pressure for driving the secondary pulley SEC, is supplied to the secondary pulley SEC from the hydraulic pressure control circuit 1.

The transmission TM further includes a mechanical oil pump MP, an electric oil pump EP, a motor M, the hydraulic pressure control circuit 1, a check valve 25, and a check valve 26. The mechanical oil pump MP supplies hydraulic oil suctioned from an oil pan T to the hydraulic pressure control circuit 1. The mechanical oil pump MP is driven by the power of the engine ENG. The electric oil pump EP is driven by power of the motor M. The electric oil pump EP supplies the hydraulic oil suctioned from the oil pan T to the hydraulic pressure control circuit 1 together with or independently of the mechanical oil pump MP. The electric oil pump EP is auxiliary to the mechanical oil pump MP. The electric oil pump EP includes the motor M.

The hydraulic pressure control circuit 1 includes a plurality of flow paths and a plurality of hydraulic pressure control valves, regulates a pressure of the hydraulic oil supplied from the mechanical oil pump MP or the electric oil pump EP, and supplies the hydraulic oil to each part of the transmission TM.

Operations of the engine ENG and the transmission TM are controlled by a controller 2 that is a control device. The controller 2 includes an engine controller (not shown) and a transmission controller (not shown). Each of the engine controller and the transmission controller is constituted as an electronic control unit, and includes a microcomputer including a central processing unit (CPU), various storage devices such as a RAM and a ROM, an input and output interface, and the like. The engine controller and the transmission controller are communicably connected to each other via a CAN standard bus. The controller 2 performs various processes by the CPU reading and executing various programs stored in the ROM or the like. The various programs executed by the controller 2 may be stored in a non-transitory storage medium such as a CD-ROM.

The controller 2 (engine controller) receives a detection signal of an operation state sensor that detects an operation state of the engine ENG, executes a predetermined calculation based on the operation state, and sets a fuel injection amount, a fuel injection timing, an ignition timing, and the like of the engine ENG. A rotation speed, a torque, and the like of the engine ENG are controlled based on commands from the controller 2 (engine controller). As the operation state sensor, an accelerator sensor that detects an operation amount of an accelerator pedal (hereinafter, referred to as "accelerator opening") by a driver, a rotation speed sensor that detects a rotation speed Ve of the engine ENG, a cooling water temperature sensor that detects a temperature of an engine cooling water, and the like are provided.

The controller 2 (transmission controller) receives detection signals from various sensors that detect an operation state of the transmission TM, and controls operations of the hydraulic pressure control circuit 1 and the electric oil pump EP based on the signals. The hydraulic pressure control circuit 1 performs hydraulic pressure control of the lock-up clutch LU, the forward clutch FWD/C, the reverse brake REV/B, the primary pulley PRI, the secondary pulley SEC, and the like based on instructions from the controller 2.

The check valve 25 allows a flow of the hydraulic oil from the mechanical oil pump MP toward the hydraulic pressure control circuit 1, and blocks a flow of the hydraulic oil from the hydraulic pressure control circuit 1 toward the mechanical oil pump MP. This prevents a line pressure PL from acting on the mechanical oil pump MP when the mechanical oil pump MP is stopped.

The check valve 26 allows a flow of the hydraulic oil from the electric oil pump EP toward the hydraulic pressure control circuit 1, and blocks a flow of the hydraulic oil from the hydraulic pressure control circuit 1 toward the electric oil pump EP. This prevents the electric oil pump EP from rotating in a reverse direction due to the line pressure PL acting on the electric oil pump EP when the electric oil pump EP is stopped.

A check valve 27 is provided between the electric oil pump EP and the oil pan T. The check valve 27 prevents the hydraulic oil from returning to the oil pan T from flow paths inside and on a suction side of the electric oil pump EP when the electric oil pump EP is stopped. Accordingly, it is possible to prevent air from entering the electric oil pump EP, in other words, prevent the electric oil pump EP from being insufficient in suction of the hydraulic oil, and to prevent a delay in the rise of a hydraulic pressure when the electric oil pump EP is operated.

Next, operation modes of the mechanical oil pump MP and the electric oil pump EP will be described.

The controller 2 switches the operation modes of the mechanical oil pump MP and the electric oil pump EP according to a driving state of the vehicle 100. In the present embodiment, the operation modes include an MP mode in which only the mechanical oil pump MP is driven by the engine ENG, an EP mode in which only the electric oil pump EP is driven, and a TDP mode in which the mechanical oil pump MP and the electric oil pump EP are driven.

The MP mode is selected when the rotation speed Ve of the engine ENG is high. Specifically, the MP mode is selected when a flow rate required (hereinafter, referred to as a "required flow rate") by hydraulic equipment mounted on the vehicle 100 can be provided by a discharge flow rate discharged by the mechanical oil pump MP. The discharge flow rate of the mechanical oil pump MP is proportional to the rotation speed Ve of the engine ENG. Therefore, when the rotation speed Ve of the engine ENG is high, the required flow rate can be provided by only the power of the engine ENG, that is, by the discharge flow rate based on the mechanical oil pump MP. In the MP mode, the electric oil pump EP is kept stopped.

The EP mode is selected when the engine ENG is stopped. When idle reduction, coast stop, or the like is being executed, the rotation of the engine ENG is stopped, and thus the rotation of the mechanical oil pump MP is also stopped. Therefore, when the rotation of the engine ENG is stopped, the controller 2 drives the motor M to drive the electric oil pump EP. Accordingly, the required flow rate can be provided by a discharge flow rate based on the electric oil pump EP.

The TDP mode is selected when the required flow rate cannot be provided by a discharge flow rate based only on the power of the engine ENG, specifically, when the rotation speed Ve of the engine ENG is low. As described above, when only the engine ENG is driven, the discharge flow rate of the mechanical oil pump MP is proportional to the rotation speed Ve of the engine ENG. Therefore, when the rotation speed Ve of the engine ENG is low, the required flow rate cannot be provided by the discharge flow rate based only on the mechanical oil pump MP. Therefore, the controller 2 drives the motor M to drive the electric oil pump EP. Accordingly, the required flow rate which is insufficient only with the discharge flow rate based only on the mechanical oil pump MP can be provided by the discharge flow rate based on the electric oil pump EP.

Here, a specific situation in which the electric oil pump EP operates will be described.

In the present embodiment, the electric oil pump EP is driven when automatic downshift control, kick-down control, idle reduction control, coast stop control, and the like are executed.

The automatic downshift control is control for automatically downshifting a speed ratio of the transmission TM. Specifically, the automatic downshift control is that, for example, when the vehicle 100 decelerates, a speed ratio of the variator VA is returned to a lowest speed ratio immediately before the vehicle 100 stops to ensure a startability after the vehicle 100 is stopped (hereinafter, returning the speed ratio of the variator VA to the lowest speed ratio is also referred to as "low returning").

The low returning is shift control in which the speed ratio of the variator VA is changed to a low speed ratio, that is, in a direction in which the speed ratio increases according to a decrease in a vehicle speed V, and is performed by downshifting the variator VA in accordance with a shift line (not shown) during coast traveling (state in which the vehicle 100 is traveling without fuel being supplied to the engine ENG) including coast stop control to be described later.

When the vehicle 100 suddenly decelerates, the secondary pulley SEC intends to stop due to a braking force of the brake. On the other hand, an inertial force of the engine ENG, the torque converter TC, and the like acts on the primary pulley PRI. When the inertial force is large, a clamping force may be insufficient and belt slip may occur. Therefore, the controller 2 quickly increases the line pressure PL to increase the secondary pulley pressure Psec. At this time, since the rotation speed Ve of the engine ENG decreases, a flow rate of the hydraulic oil supplied from the mechanical oil pump MP decreases. Therefore, in such a situation, the controller 2 operates the electric oil pump EP to quickly increase the line pressure PL so as to increase the secondary pulley pressure Psec, thereby preventing belt slip. When the vehicle 100 suddenly decelerates in this manner, the low returning is performed while increasing the secondary pulley pressure Psec, and thus the required flow rate increases. Therefore, a rotation speed of the electric oil pump EP increases.

The electric oil pump EP is also driven during the kick-down control. The kick-down control is shift control for accelerating the vehicle 100 by significantly downshifting from a current speed ratio to a low speed ratio when a driver suddenly depresses the accelerator pedal. When the kick-down control is executed, a high shift rate is required, and thus the required flow rate increases. Therefore, since the flow rate of the hydraulic oil supplied from the mechanical oil pump MP cannot satisfy the required flow rate, the electric oil pump EP is driven.

The coast stop control is control for reducing fuel consumption by automatically stopping the engine ENG to reduce the deceleration due to friction of the engine ENG and delaying a timing of fuel cut recovery (restart of fuel supply to the engine ENG) due to a decrease in the vehicle speed while the vehicle 100 is coasting. Specifically, the coast stop control is that, when an accelerator is off during traveling, the fuel supply to the engine ENG is stopped, and the power transmission between the engine ENG and the drive wheels DW is cut off by disengaging the forward clutch FWD/C, so that the engine ENG is automatically stopped (rotation of the engine ENG is stopped). The coasting by fuel cut control executed when the accelerator is off is common in that the fuel supply to the engine ENG is stopped, but is different in that the power transmission path between the engine ENG and the drive wheels DW is cut off to stop the rotation of the engine ENG. In the fuel cut control executed during coast traveling when the accelerator is off, when the vehicle speed decreases and the rotation speed of the engine ENG driven by the drive wheels DW decreases, the lock-up clutch LU is disengaged and fuel injection is restarted to maintain a self-sustaining state of the engine ENG.

In executing the coast stop control, the controller 2 first determines coast stop conditions (a) to (c) shown below.
 (a): a foot is released from an accelerator pedal (accelerator opening APO=0);
 (b): a brake pedal is depressed (brake depression force or brake pressure is equal to or larger than a predetermined value); and
 (c): the vehicle speed V is equal to or lower than a predetermined low vehicle speed (for example, 10 km/h to 20 km/h) (predetermined vehicle speed V1).

In other words, these conditions are conditions for determining whether the driver intends to stop the vehicle. The controller 2 determines that coast stop conditions are satisfied when all of the conditions (a) to (c) are satisfied. In addition, conditions such as a remaining capacity of a battery (not shown) and a temperature of a cooling water may be included.

The lock-up clutch LU is disengaged when the lock-up clutch LU crosses a lock-up release line (not shown) set on a shift map from a high-speed side or a high-speed rotation side to a low-speed side or a low-speed rotation side.

The idle reduction control is control for stopping the idling of the engine ENG in a case in which a predetermined condition is satisfied when the vehicle 100 is being stopped. In executing the idle reduction control, the controller 2 first determines idle reduction conditions (d) to (f) shown below.
 (d): a foot is released from an accelerator pedal (accelerator opening APO=0);
 (e): a brake pedal is depressed (brake depression force or brake pressure is equal to or larger than a predetermined value); and
 (f): the vehicle speed V is 0.

In other words, these conditions are conditions for determining whether the driver intends to stop the vehicle. The controller 2 determines that idle reduction conditions are satisfied when all of the conditions (d) to (f) are satisfied. In addition, the conditions such as the remaining capacity of the battery (not shown) and the temperature of the cooling water may be included.

Incidentally, in the transmission TM, the check valve 27 provided on the suction side of the electric oil pump EP may fail and not be opened. When the check valve 27 is not opened, the electric oil pump EP cannot suction the hydraulic oil from the oil pan T, and as a result, cannot supply the hydraulic oil to a line pressure oil passage 30. Therefore, when the check valve 27 fails, the required flow rate is satisfied only by the mechanical oil pump MP, or a certain measure is required.

However, it is difficult to directly detect the failure of the check valve 27. Therefore, in the present embodiment, it is determined whether the check valve 27 fails by the following method. A specific description will be given below.

Figure 2:
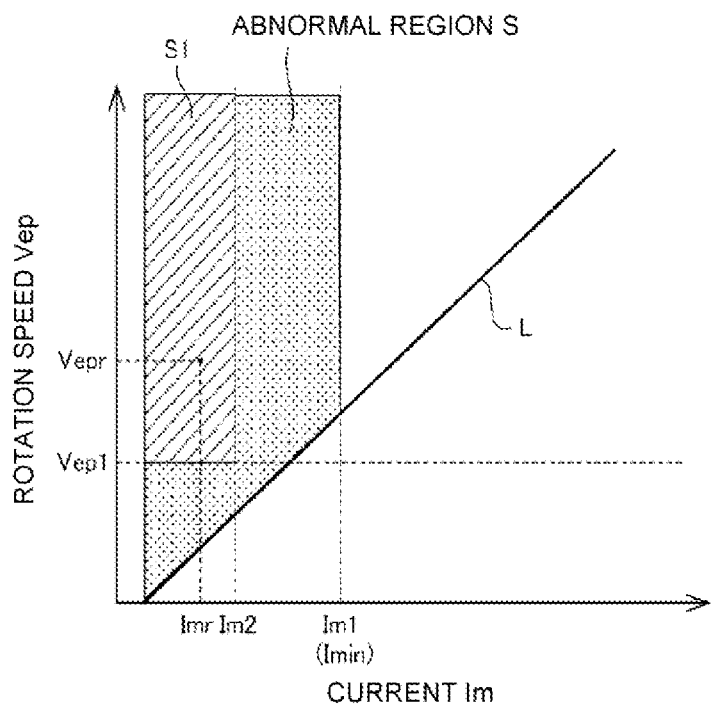
FIG. 2 is a diagram illustrating an abnormal region of an electric oil pump according to the present embodiment.

When the electric oil pump EP is driven in a normal state, a rotation speed Vep of the electric oil pump EP and a drive current value Im of the motor M have a relation as indicated by a straight line L in FIG. 2. The normal state means a state in which there is no abnormality in each element including the motor M in a state in which the inside of the electric oil pump EP (the inside of a pump chamber, the inside of a suction port, and the like) and an upstream side and a downstream side of the electric oil pump EP are filled with the hydraulic oil.

As described above, when the check valve 27 is not opened, the electric oil pump EP cannot suction the hydraulic oil from the oil pan T. In this state, since a load of the electric oil pump EP is reduced even when the electric oil pump EP rotates at a predetermined rotation speed Vepr, a drive current value Imr is smaller than a predetermined first current value Im1 (see FIG. 2).

Figure 3:
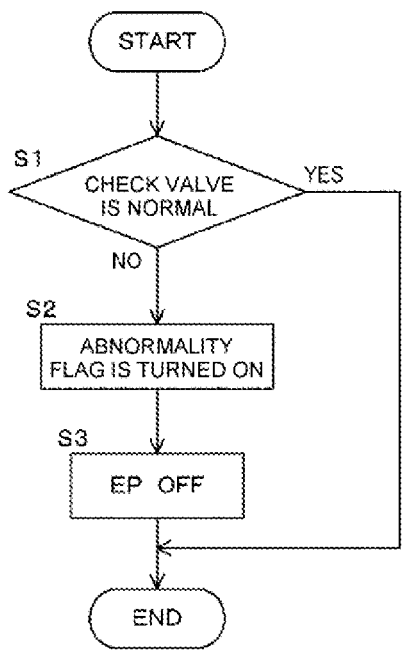
FIG. 3 is a flowchart of abnormality determination for a check valve.
Figure 4:
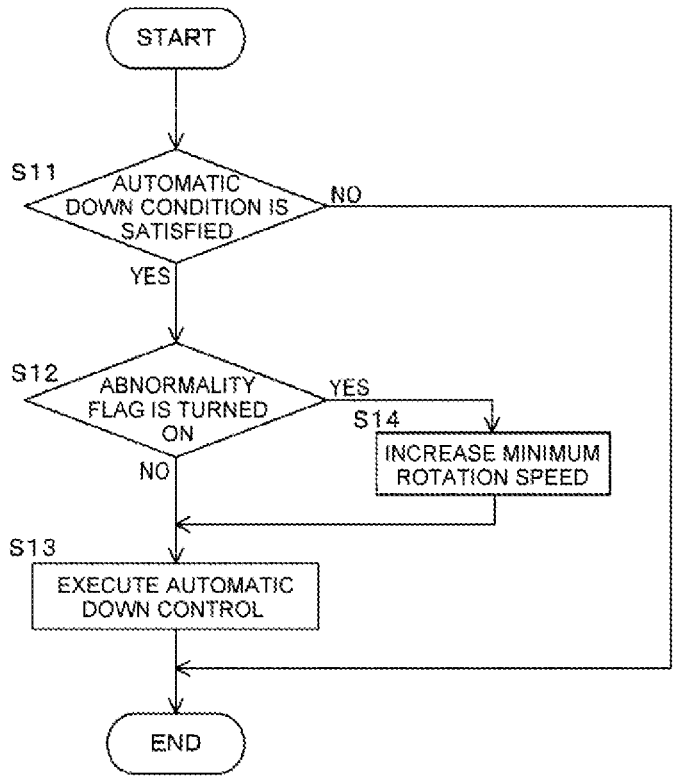
FIG. 4 is a flowchart of automatic downshift control.

Therefore, in the present embodiment, according to such characteristics, it is determined whether the check valve 27 fails based on the rotation speed Vep of the electric oil pump EP and the drive current value Im of the motor M. Hereinafter, control of the failure of the check valve 27 will be described with reference to flowcharts illustrated in FIGS. 3 to 6. First, the failure determination for the check valve 27 will be described with reference to FIG. 3. The control of the failure of the check valve 27 to be described below is performed by executing a program stored in the controller 2 in advance.

In step S1, it is determined whether the check valve 27 is normal (state in which the check valve 27 in a closed state is opened when the electric oil pump EP is driven, and the hydraulic oil is supplied to the electric oil pump). Specifically, the controller 2 determines whether the rotation speed Vep of the electric oil pump EP and the drive current value Im is within an abnormal region S illustrated in FIG. 2 when the electric oil pump EP is operated. The abnormal region S is set to be a region in which the drive current value Im of the motor M obtained when the electric oil pump EP is driven in the normal drive state (when the check valve 27 is opened by the driving of the electric oil pump EP, and the electric oil pump EP is driven in the state in which the hydraulic oil is supplied to the electric oil pump) is equal to or smaller than a minimum value Imin (first current value Im1), and in which the rotation speed Vep is higher than the straight line L. When an operation state of the electric oil pump EP is within the abnormal region S set as described above, it can be determined that the load of the electric oil pump EP is abnormally reduced. Therefore, in such a case, it is determined that the check valve 27 is not normal (check valve 27 is in a badly opened state).

If it is determined in step S1 that the check valve 27 is normal, the process proceeds to END. On the other hand, if it is determined that the check valve 27 is not normal, the process proceeds to step S2.

In step S2, an abnormality flag is turned on. Specifically, the controller 2 turns on the abnormality flag. The abnormality flag is used for the control to be described later.

In step S3, the electric oil pump EP is turned off. Specifically, thereafter, the controller 2 does not drive the electric oil pump EP even in a situation in which the electric oil pump EP is to be driven. At this time, a warning may be issued to the driver or a maintenance worker.

Next, the control when there is a drive request to the electric oil pump EP will be described.

As described above, the electric oil pump EP operates when the automatic downshift control, the idle reduction control, and the coast stop control are executed. First, the automatic downshift control will be described with reference to FIG. 4.

In step S11, it is determined whether an automatic down condition is satisfied. Specifically, the controller 2 determines whether a low returning condition is satisfied.

If it is determined in step S11 that the automatic down condition is satisfied, the process proceeds to step S12, and if it is determined in step S11 that the automatic down condition is not satisfied, the process proceeds to END.

In step S12, it is determined whether the abnormality flag is turned on or off. If the abnormality flag is turned off, the process proceeds to step S13, and the automatic downshift control is executed. On the other hand, if the abnormality flag is turned on, the process proceeds to step S14.

In step S14, a minimum rotation speed Vemin of the engine ENG is increased. Specifically, the controller 2 controls the minimum rotation speed Vemin of the engine ENG to be increased by a predetermined rotation speed compared to the normal state (state in which the drive current value Im of the motor M does not fall to the minimum value Imin or less). In other words, the controller 2 increases a lower limit value of the rotation speed Ve of the engine ENG by a predetermined rotation speed. The minimum rotation speed Vemin of the engine ENG is, for example, an idling rotation speed of the engine ENG.

In this manner, by increasing the minimum rotation speed Vemin of the engine ENG by a predetermined rotation speed, a minimum supply flow rate of the mechanical oil pump MP can be increased when the engine ENG is rotating at the minimum rotation speed Vemin (for example, idling rotation speed). Accordingly, even when the electric oil pump EP is stopped, the required flow rate of the hydraulic oil can be supplied only by the mechanical oil pump MP. The predetermined rotation speed to be increased is set in consideration of a discharge performance of the mechanical oil pump MP and a discharge performance of the electric oil pump EP.

After the minimum rotation speed Vemin of the engine ENG is set to be increased in step S14, the process proceeds to step S13, and the automatic downshift control is executed. In this case, since the electric oil pump EP is not driven, the required flow rate is supplied only by the mechanical oil pump MP.

Figure 5:
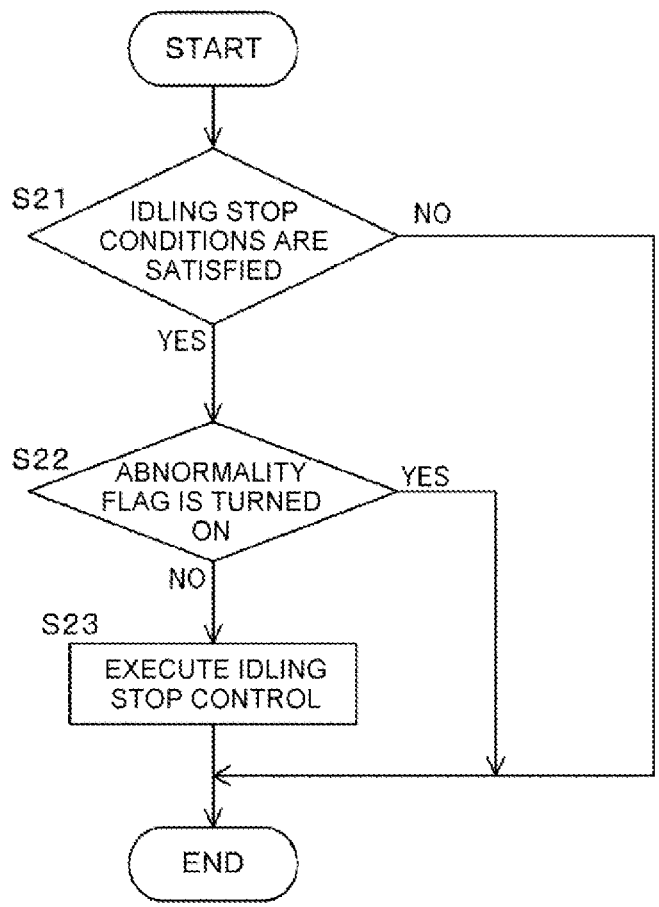
FIG. 5 is a flowchart of idle reduction control.

Next, the idle reduction control will be described with reference to FIG. 5.

In step S21, it is determined whether the idle reduction conditions are satisfied. Specifically, the controller 2 determines whether the above execution conditions of the idle reduction control are satisfied.

If it is determined in step S21 that the idle reduction conditions are satisfied, the process proceeds to step S22, and if it is determined in step S21 that the idle reduction conditions are not satisfied, the process proceeds to END.

In step S22, it is determined whether the abnormality flag is turned on or off. If the abnormality flag is turned off, the process proceeds to step S23, and the idle reduction control is executed. On the other hand, if the abnormality flag is turned on, the process proceeds to END.

If the engine ENG is stopped in a state in which the hydraulic oil cannot be supplied from the electric oil pump EP, the hydraulic oil required by each element of the transmission TM cannot be supplied. Therefore, in the present embodiment, when it is determined that the abnormality flag is turned on, that is, when it is determined that the operation state of the electric oil pump EP is within the abnormal region S, the idle reduction control is not executed. Accordingly, even when the vehicle 100 is being stopped, the hydraulic oil required by the hydraulic pressure control circuit 1 can be supplied.

Figure 6:
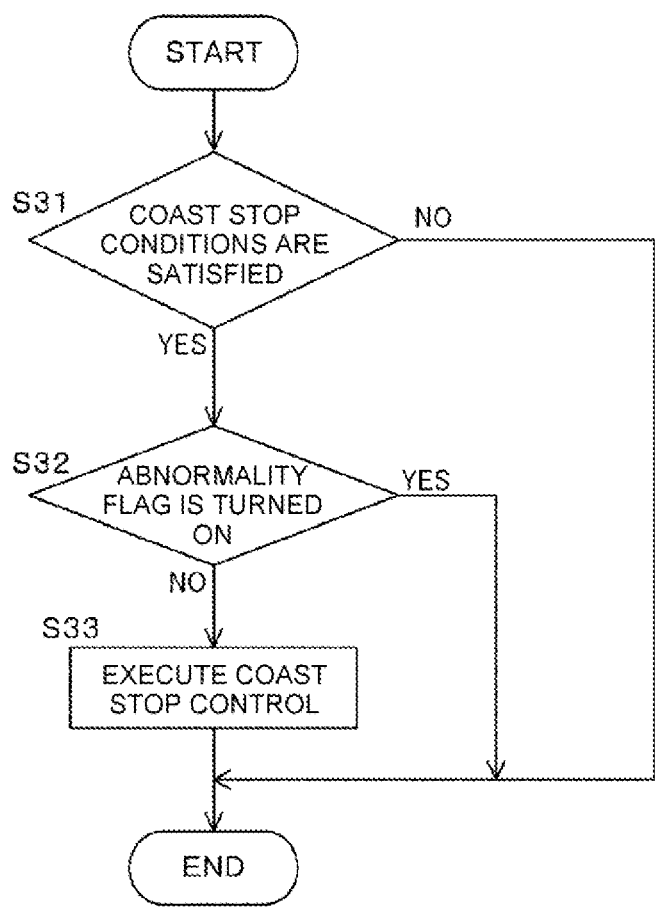
FIG. 6 is a flowchart of coast stop control.

Next, the coast stop control will be described with reference to FIG. 6.

In step S31, it is determined whether the coast stop conditions are satisfied. Specifically, the controller 2 determines whether the above execution conditions of the coast stop control are satisfied.

If it is determined in step S31 that the coast stop conditions are satisfied, the process proceeds to step S32, and if it is determined in step S31 that the coast stop conditions are not satisfied, the process proceeds to END.

In step S32, it is determined whether the abnormality flag is turned on or off. If the abnormality flag is turned off, the process proceeds to step S33, and the coast stop control is executed. On the other hand, if the abnormality flag is turned on, the process proceeds to END.

If the engine ENG is stopped in a state in which the hydraulic oil cannot be discharged from the electric oil pump EP, the required hydraulic oil cannot be supplied. Therefore, in the present embodiment, when it is determined that the abnormality flag is turned on, that is, when it is determined that the operation state of the electric oil pump EP is within the abnormal region S, the coast stop control is not executed. Accordingly, even when the vehicle 100 is coasting, the hydraulic oil required by the hydraulic pressure control circuit 1 can be supplied. Accordingly, it is possible to reliably execute the low returning or the like.

In the above embodiment, the abnormal region S is set to be the region in which the drive current value Im of the motor M obtained when the electric oil pump EP is driven in the normal drive state is equal to or smaller than the minimum value Imin (first current value Im1), and in which the rotation speed Vep is higher than the straight line L. However, the abnormal region may be set to be a region S1 (hatched portion in FIG. 2) in which the drive current value Im of the motor M is equal to or smaller than Im2, which is smaller than the minimum value Imin (first current value Im1) by a predetermined amount, and in which the rotation speed Vep of the electric oil pump EP is higher than a rotation speed Vep1 that is normally used. By setting the abnormal region to be such a region S1, an error due to noise or the like can be allowed, and thus erroneous determination can be prevented.

In the present embodiment, the failure of the check valve 27 is detected based on the operation state of the electric oil pump EP, and when the check valve 27 fails, the flow rate of the hydraulic oil for controlling the transmission TM can be controlled so as not to be insufficient. That is, according to the present embodiment, the transmission TM can be appropriately controlled even when the check valve 27 is not opened.

The configurations, actions, and effects of the embodiment of the present invention configured as described above will be collectively described.

The vehicle 100 includes the transmission TM including the mechanical oil pump MP (first oil pump) driven by the rotation of the engine ENG (drive source) that drives the drive wheels DW, and the electric oil pump EP (second oil pump) provided with the check valve 27 on the suction side and driven by the motor M. The controller 2 (control device) for controlling the vehicle 100 increases, when the minimum value Imin of the drive current value Im of the motor M when the electric oil pump EP (second oil pump) is driven in the normal drive state is defined as the first current value Im1, when the automatic downshift control for automatically downshifting the speed ratio of the transmission TM is executed in a case in which the drive current value Im of the motor M is smaller than the first current value Im1 when the electric oil pump EP (second oil pump) is driven, the minimum rotation speed Vemin of the engine ENG (drive source) compared to a case in which the drive current value Im of the motor M is equal to or larger than the first current value Im1.

In this configuration, when the automatic downshift control is executed in a case in which the drive current value Im of the motor M is smaller than the first current value Im1 when the electric oil pump EP (second oil pump) is driven, that is, in a case in which the check valve 27 fails, the minimum rotation speed Vemin of the engine ENG is increased by the predetermined rotation speed. Accordingly, when the engine ENG is rotating at the minimum rotation speed Vemin (for example, idling rotation speed), the minimum supply flow rate of the mechanical oil pump MP can be increased, and thus the required flow rate of the hydraulic oil can be supplied only by the mechanical oil pump MP even when the electric oil pump EP is stopped. Therefore, even when the check valve 27 is not opened, it is possible to prevent a delay in the downshift and appropriately control the transmission TM.

In the vehicle 100, when the automatic downshift control is executed in a case in which the drive current value Im of the motor M is equal to or smaller than the second current value Im2, the second current value Im2 being smaller than the first current value Im1 by the predetermined amount, the minimum rotation speed Vemin of the drive source (engine ENG) is increased compared to the case in which the drive current value Im of the motor M is equal to or larger than the first current value Im1.

In this configuration, the error due to noise or the like can be allowed, and thus the erroneous determination can be prevented.

The vehicle 100 includes the transmission TM including the mechanical oil pump MP (first oil pump) driven by the rotation of the engine ENG (drive source) that drives the drive wheels DW, and the electric oil pump EP (second oil pump) provided with the check valve 27 on the suction side and driven by the motor M. The controller 2 (control device) for controlling the vehicle 100 does not execute, when the minimum value Imin of the drive current value Im of the motor M when the electric oil pump EP (second oil pump) is driven in the normal drive state is defined as the first current value Im1, the idle reduction control for automatically stopping the engine ENG (drive source) while the vehicle is stopped in a case in which the drive current value Im of the motor M is smaller than the first current value Im1 when the electric oil pump EP (second oil pump) is driven.

In this configuration, the idle reduction control is not executed in a case in which the drive current value Im of the motor M is smaller than the first current value Im1 when the electric oil pump EP (second oil pump) is driven, that is, in a case in which the check valve 27 fails. Accordingly, when the vehicle 100 is stopped, the required flow rate of the hydraulic oil can be supplied by the mechanical oil pump MP. Therefore, the transmission TM can be appropriately controlled even when the check valve 27 is not opened.

In the vehicle 100, the idle reduction control is not executed in a case in which the drive current value Im of the motor M is equal to or smaller than the second current value Im2 that is smaller than the first current value Im1 by the predetermined amount.

In this configuration, the error due to noise or the like can be allowed, and thus the erroneous determination can be prevented.

The vehicle 100 includes the transmission TM including the mechanical oil pump MP (first oil pump) driven by the rotation of the engine ENG (drive source) that drives the drive wheels DW, and the electric oil pump EP (second oil pump) provided with the check valve 27 on the suction side and driven by the motor M. The controller 2 (control device) for controlling the vehicle 100 does not execute, when the minimum value Imin of the drive current value Im of the motor M when the electric oil pump EP (second oil pump) is driven in the normal drive state is defined as the first current value Im1, the coast stop control for stopping the engine ENG (drive source) automatically and interrupting the power transmission between the engine ENG (drive source) and the drive wheels DW while the vehicle is traveling in a case in which the drive current value Im of the motor M is smaller than the first current value Im1 when the electric oil pump EP (second oil pump) is driven.

In this configuration, the coast stop control is not executed in the case in which the drive current value Im of the motor M is smaller than the first current value Im1 when the electric oil pump EP (second oil pump) is driven, that is, in the case in which the check valve 27 fails. Accordingly, when the vehicle 100 is coasting, the required flow rate of the hydraulic oil can be supplied by the mechanical oil pump MP. Therefore, the transmission TM can be appropriately controlled even when the check valve 27 is not opened.

In the vehicle 100, the coast stop control is not executed in a case in which the drive current value Im of the motor M is equal to or smaller than the second current value Im2 that is smaller than the first current value Im1 by the predetermined amount.

In this configuration, the error due to noise or the like can be allowed, and thus the erroneous determination can be prevented.

In the vehicle 100, when the drive current value Im of the motor Mis equal to or smaller than the second current value Im2, the electric oil pump EP (second oil pump) is not driven thereafter.

Even when the check valve 27 fails, a small amount of hydraulic oil may be supplied from the electric oil pump EP (second oil pump). In such a situation, the control may become unstable. Therefore, in such a case, the control can be stabilized by stopping the driving of the electric oil pump EP (second oil pump).

The engine ENG may be a diesel engine.

In the above embodiment, a vehicle capable of executing all of the automatic downshift control, the idle reduction control, and the coast stop control has been described as an example, and any vehicle capable of executing any of these controls may be used.

The transmission TM is not limited to a continuously variable transmission, and may be a stepped transmission.

DESCRIPTION OF REFERENCE SIGNS

100 vehicle
1 hydraulic pressure control circuit
2 controller (control device)
27 check valve
ENG engine (drive source)
DW drive wheel
M motor
TM transmission
EP electric oil pump (first oil pump)
MP mechanical oil pump (second oil pump)

The present application claims a priority of Japanese Patent Application No. 2021-035858 filed with the Japan Patent Office on Mar. 5, 2021, all the contents of which are hereby incorporated by reference.

The invention claimed is:

1. A vehicle control device for controlling a vehicle including a transmission, the transmission including a first oil pump driven by rotation of a drive source that drives a drive wheel, and a second oil pump provided with a check valve on a suction side and driven by a motor, wherein
   a minimum value of a drive current value of the motor is defined as a first current value, when the second oil pump is driven in a normal drive state, and
   a minimum rotation speed of the drive source is increased compared to a case in which the drive current value of the motor is equal to or larger than the first current value, when an automatic downshift control for automatically downshifting a speed ratio of the transmission is executed in a case in which the drive current value of the motor is smaller than the first current value when the second oil pump is driven.

2. The vehicle control device according to claim 1, wherein
   when the automatic downshift control is executed in a case in which the drive current value of the motor is equal to or smaller than a second current value, the second current value being smaller than the first current value by a predetermined amount, the minimum rotation speed of the drive source is increased compared to the case in which the drive current value of the motor is equal to or larger than the first current value.

3. The vehicle control device according to claim 2, wherein
   when the drive current value of the motor is equal to or smaller than the second current value, the second oil pump is not driven thereafter.

4. A vehicle control device for controlling a vehicle including a transmission, the transmission including a first oil pump driven by rotation of a drive source that drives a drive wheel, and a second oil pump provided with a check valve on a suction side and driven by a motor, wherein
   a minimum value of a drive current value of the motor is defined as a first current value, when the second oil pump is driven in a normal drive state, and
   an idle reduction control for automatically stopping the drive source while the vehicle is stopped is not executed in a case in which the drive current value of the motor is smaller than the first current value when the second oil pump is driven.

5. The vehicle control device according to claim 4, wherein
   the idle reduction control is not executed in a case in which the drive current value of the motor is equal to or smaller than a second current value that is smaller than the first current value by a predetermined amount.

6. A vehicle control device for controlling a vehicle including a transmission, the transmission including a first oil pump driven by rotation of a drive source that drives a drive wheel, and a second oil pump provided with a check valve on a suction side and driven by a motor, wherein
   a minimum value of a drive current value of the motor is defined as a first current value, when the second oil pump is driven in a normal drive state, and
   a coast stop control for stopping the engine ENG (drive source) automatically and interrupting power transmission between the drive source and the drive wheel while the vehicle is traveling is not executed in a case in which the drive current value of the motor is smaller than the first current value when the second oil pump is driven.

7. The vehicle control device according to claim 6, wherein the coast stop control is not executed in a case in which the drive current value of the motor is equal to or smaller than a second current value that is smaller than the first current value by a predetermined amount.

* * * * *